US008934157B2

(12) United States Patent
Kudo

(10) Patent No.: US 8,934,157 B2
(45) Date of Patent: Jan. 13, 2015

(54) PRINTING SYSTEM, PRINTER AND TERMINAL DEVICE THEREFOR, AND RECORDING MEDIUM CONTAINING PROGRAM FOR PRINTER OR TERMINAL DEVICE

(75) Inventor: Yasuhiro Kudo, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 1181 days.

(21) Appl. No.: 12/548,957

(22) Filed: Aug. 27, 2009

(65) Prior Publication Data

US 2010/0053677 A1  Mar. 4, 2010

(30) Foreign Application Priority Data

Aug. 31, 2008 (JP) .................................. 2008-222964

(51) Int. Cl.
   G06F 3/12 (2006.01)
   G03F 3/10 (2006.01)
   G06F 17/00 (2006.01)
   G06F 3/14 (2006.01)

(52) U.S. Cl.
   CPC ............ *G06F 3/1205* (2013.01); *G06F 3/1208* (2013.01); *G06F 3/125* (2013.01); *G06F 3/1256* (2013.01); *G06F 3/1285* (2013.01)
   USPC ........... 358/527; 358/1.15; 715/274; 715/864

(58) Field of Classification Search
   None
   See application file for complete search history.

(56) References Cited

U.S. PATENT DOCUMENTS

| 2002/0054301 | A1* | 5/2002 | Iwai et al. ....................... 358/1.2 |
| 2003/0002056 | A1  | 1/2003 | Yamaguchi et al. |
| 2004/0036916 | A1* | 2/2004 | Yamaguchi .................. 358/1.18 |
| 2007/0180273 | A1* | 8/2007 | Dohi .............................. 713/193 |

FOREIGN PATENT DOCUMENTS

| JP | 2003-54066     | 2/2003  |
| JP | 2003-162396 A  | 6/2003  |
| JP | 2004-164169 A  | 6/2004  |
| JP | 2004-280441    | 10/2004 |
| JP | 2007-048214 A  | 2/2007  |

OTHER PUBLICATIONS

Translation for JP 2007-048214.*
Translation for JP 2003-162396.*
Japanese Official Action dated May 25, 2010 with English translation.

* cited by examiner

*Primary Examiner* — Saeid Ebrahimi Dehkordy
*Assistant Examiner* — Lennin Rodriguezgonzale
(74) *Attorney, Agent, or Firm* — Scully, Scott, Muprhy & Presser, PC

(57) ABSTRACT

A printing system has a printer and a terminal device. The printer has a first data receiving unit to receive print data and layout data request that requests the terminal device to transmit layout data representing an arrangement of objects, a layout data generating unit to generate the layout data based on the print data, and a second data transmitting unit to transmit the layout data to the terminal device. The terminal device has a first data transmitting unit to transmit the print data and the layout data request to the printer, a second data receiving unit to receive the layout data from the printer, a preview image generating unit to generate preview image data representing a printing result with the use of the layout data, and a display unit to display a preview image represented by the preview image data on a display unit.

13 Claims, 10 Drawing Sheets

```
HTTP/1.1 200 OK
Content-Type: application/xhtml-print
```
```
border:Specifying the frame of object
image-orientation:Specifying the image rotation
font:Specifying the font
<u>Specifying the underline
```
```
       <html>
(i)    <body>
     ┌─<img style="border:solid 1px black;"
(ii) │       src="http://192. 168. 1.2/img1. jpg"/>
     └─<img style="border:solid 1px black; image-orientation: 90deg;"
(iii)┌       src="http://192. 168. 1.2/img2. jpg"/>
     └─<p style="font:Gothic, sans-serif">It' s a <u>Sample</u>. </p>
       </body>
       </html>
```

FIG.3A

```
HTTP/1.1 200OK
Content-Type: application/xhtml-print

<html>
(i')    <body>
      ┌─<img style="border:solid 1px black: top:16mm; left:11mm; width:146mm; height:30mm;"
(ii') │       src="http://192. 168. 1.2/img1. jpg"/>
      └─<img style="border:solid 1px black; image-orientation: 90deg;"
(iii) ┌           top:16mm; left:164mm; width:20mm; height:148mm;"
      │       src="http://192. 168. 1.2/img2. jpg"/>
      └─<p style="font:Gothic, sans-serif">It' s a <u>Sample</u>. </p>
        </body>
        </html>
```

FIG.3B

```
POST /soap HTTP/1.1

<?xml version="1.0"?>
<s:Envelope xmlns:s="http://schemas.xmlsoap.org/soap/envelope/">
  <s:Body>
    <u:LayoutURI xmlns:u="http://brother.com/upnp/printpreview">
      <u:DocumentFormat>application/xhtml-print</u:DocumentFormat>
      <u:NumberUp>1</u:NumberUp>
      <u:OrientationRequested>portrait</u:OrientationRequested>
      <u:MediaSize>iso_a4_210x297mm</u:MediaSize>
      <u:PreviewSize>424, 600</u:PreviewSize>
      <u:SourceURI>http://192.168.1.2/print1.html</u:SourceURI>
    </u:LayoutURI>
  </s:Body>
</s:Envelope>
```

(i) `<s:Body>`
(ii) `<u:LayoutURI ...>`
(iii) `<u:DocumentFormat>`
(iv) `<u:NumberUp>`
(v) `<u:OrientationRequested>`
(vi) `<u:MediaSize>`
(vii) `<u:PreviewSize>`
(viii) `<u:SourceURI>`

FIG. 6

```
GET /print1.html HTTP/1.1
```

FIG. 7

```
HTTP/1.1 200 OK

<?xml version="1.0"?>
<s:Envelope xmlns:s="http://schemas.xmlsoap.org/soap/envelope/">
  <s:Body>
    <u:LayoutURIResponse xmlns:u="http://brother.com/upnp/printpreview">
      <u:LayoutData>
<![CDATA[
PAGE w=424 h=600
IMG x=0 y=0 w=424 h=600 data=jpeg/inline datasize=1024
•••(JPEQ data of the background image)•••
IMG x=22 y=32 w=300 h=60 src="http//192.168.1.2/img1.jpg"
IMG x=332 y=32 w=40 h=300 r=90 src="http//192.168.1.2/img2.jpg"
FONTFROUP x=22 y=344 h=24 col=000 type="Gothic" {
    FONT x=22 w=12 char=I
    FONT x=34 w=16 char=t
    FONT x=50 w=12 char='
    FONT x=62 w=16 char=s
    FONT x=92 w=16 char=a
    FONT x=122 w=18 char=S
    FONT x=140 w=16 char=a
    FONT x=156 w=18 char=m
    FONT x=174 w=15 char=p
    FONT x=190 w=12 char=l
    FONT x=202 w=16 char=e
    FONT x=218 w=12 char=.
}
]]>
      </u:LayoutData>
    </u:LayoutURIResponse>
  </s:Body>
</s:Envelope>
```

FIG. 8A

```
HTTP/1.1 200 OK

<?xml version="1.0"?>
<s:Envelope xmlns:s="http://schemas.xmlsoap.org/soap/envelope/">
  (i)    <s:Body>
  (ii)     <u:LayoutURIResponse xmlns:u="http://brother.com/upnp/printpreview">
             <u:LayoutData>
  (iii)  <![CDATA[
         PAGE w=424 h=600
  (v)    IMG x=22 y=32 w=300 h=60 src="http//192.168.1.2/img1.jpg"
  (iv')  LINEBOX x=22 y=32 w=300 h=60 linew=1 col=000
  (vi)   IMG x=332 y=32 w=40 h=300 r=90 src="http//192.168.1.2/img2.jpg"
  (iv")  LINEBOX x=332 y=32 w=40 h=300 linew=1 col=000
  (vii)  FONTFROUP x=22 y=344 h=24 col=000 type="Gothic" {
             FONT x=22 w=12 char=I
             FONT x=34 w=16 char=t
             FONT x=50 w=12 char='
             FONT x=62 w=16 char=s
             FONT x=92 w=16 char=a
  (viii)     FONT x=122 w=18 char=S
             FONT x=140 w=16 char=a
             FONT x=156 w=18 char=m
             FONT x=174 w=15 char=p
             FONT x=190 w=12 char=l
             FONT x=202 w=16 char=e
             FONT x=218 w=12 char=.
         }
  (iv''') LINE x=121 y=358 stepx=98 linew=1 col=000
         ]]>
  (ix)     </u:LayoutData>
  (x)    </u:LayoutURIResponse>
       </s:Body>
</s:Envelope>
```

FIG.8B

PRINTING SYSTEM, PRINTER AND TERMINAL DEVICE THEREFOR, AND
RECORDING MEDIUM CONTAINING
PROGRAM FOR PRINTER OR TERMINAL
DEVICE

CROSS-REFERENCE TO RELATED APPLICATION

This application claims priority under 35 U.S.C. §119 from Japanese Patent Application No. 2008-222964 filed on Aug. 31, 2008. The entire subject matter of the application is incorporated herein by reference.

BACKGROUND

1. Technical Field

Aspects of the invention relate to a printing system, printer and terminal device therefor, and a recording medium containing a program for the printer/terminal device. In particular, aspects of the invention relate to techniques to display a preview image used in the printing system, the printer and/or the terminal device.

2. Related Art

Conventionally, there has been known a printing system including a printer and a terminal device (e.g., a personal computer) that has a function of transmitting print data to the printer for printing. Typically, such a printing system employs a so-called preview function which enables a user of the terminal device to view a print preview image, which may be displayed on a display unit of the terminal device, before the image is actually printed by the printer.

Examples of such a printing system are disclosed in Japanese Patent Provisional Publications No. 2003-54066 (hereinafter, referred to as '066 publication) and No. 2004-280441. A printing system disclosed in '066 publication is configured such that a printer generates preview image data based on information transmitted from a receiver unit which is configured to receive a digital broadcasting and display broadcast contents. Then the printer transmits the thus generated preview image data to the receiver unit so that a preview image is displayed on a display device of the receiver unit. When the user of the receiver requires a preview image of currently receiving broadcast contents, the receiver unit transmits XML contents, which include an XML instance and a style sheet, print job information indicative of a printing condition (e.g., a size of a print sheet, a print resolution, an image orientation) and preview information indicative of a required condition for preview data, to the printer. In response to the above data, the printer generates the preview data, which can be displayed on the display device of the receiving unit as it is, based on the XML contents so as to meet the conditions represented by the print job information and the preview information, and transmits the thus generated preview data to the receiver unit.

SUMMARY

The preview function is convenient. However, there remain problems in the conventional preview function as follows. Firstly, even if the preview data is generated as above, the actually printed image might be different from the preview image. Secondly, since the preview data is generated on the printer side, the printer might be overloaded.

In consideration of the above problems, aspects of the invention provide an advantageous printing system in which a preview image which fully correspond to an image printed on a print sheet, while reducing the load to the printer.

According to aspects of the present invention, there is provided a printing system including a printer and a terminal device connected to the printer. The terminal device has a first data transmitting unit. The printer has a first data receiving unit, a layout data generating unit, and a second data transmitting unit, and the terminal device further has a second data receiving unit, a preview image generating unit, and a display unit. The first data transmitting unit transmits print data and a layout data request to the printer, and the layout data request requests the printer to transmit layout data representing an arrangement of objects to be printed on a print sheet if the printer would print the print data. The first data receiving unit receives the print data and the layout data request from the terminal device. The layout data generating unit generates the layout data based on the print data in response to the layout data request. The second data transmitting unit transmits the layout data generated by the layout data generating unit to the terminal device. The second data receiving unit receives the layout data from the printer. The preview image generating unit generates preview image data representing a preview image showing a result of printing if the print data would be printed on the print sheet in accordance with the layout data. The display unit displays the preview image represented by the preview image data generated by the preview image generating unit.

According to the above configuration, the preview image which well corresponds to an image that would be printed on a print sheet can be obtained, while the load to the printer can be reduced.

According to aspects of the present invention, there is provided a printer communicatably connected to a terminal device which is configured to generate preview image data using layout data representing an arrangement of objects to be printed on a print sheet if the printer would print print data, and display a preview image based on the preview image data. The printer has a data receiving unit, a layout data generating unit, and a data transmitting unit. The data receiving unit receives the print data and the layout data request from the terminal device. The layout data generating unit generates the layout data based on the print data in response to the layout data request. The data transmitting unit transmits the layout data generated by the layout data generating unit to the terminal device.

According to aspects of the present invention, there is provided a terminal device communicatably connected to a printer which prints print data and generates layout data representing an arrangement of objects to be printed on a print sheet If the printer would print the print data. The terminal device has a data transmitting unit, a data receiving unit, a preview image generating unit, and a display unit. The data transmitting unit transmits the print data and layout data request to the printer, and the layout data request requests the printer to transmit the layout data. The data receiving unit receives the layout data transmitted from the printer in response to the layout data request. The preview image generating unit generates preview image data representing a preview image showing a printing result if the printer would print the print data on the print sheet with use of the layout data. The display unit displays the preview image on a display unit.

According to aspects of the present invention, there is provided a recording medium containing a program for printer communicatably connected to a terminal device which is configured to generate preview image data using layout data representing an arrangement of objects to be printed on a print sheet if the printer would print print data, and display a preview image based on the preview image data. The program causes the printer to execute a data receiving step, a layout data generating step and a data transmitting step. The data receiving step receives the print data and the layout data request from the terminal device. The layout data generating step generates the layout data based on the print data in response to the layout data request. The data transmitting step transmits the layout data generated by the layout data generating unit to the terminal device.

According to aspects of the present invention, there is provided a recording medium containing a program for terminal device communicatably connected to a printer which prints print data and generates layout data representing an arrangement of objects to be printed on a print sheet If the printer would print the print data. The program causes the terminal device to execute a data transmitting step, a data receiving step, a preview image generating step and a display step. The data transmitting step transmits the print data and layout data request to the printer, and the layout data request requests the printer to transmit the layout data. The data receiving step receives the layout data transmitted from the printer in response to the layout data request. The preview image generating step generates preview image data representing a preview image showing a printing result if the printer prints the print data on the print sheet with use of the layout data. The display step displays the preview image on a display unit.

BRIEF DESCRIPTION OF THE ACCOMPANYING DRAWINGS

FIGS. 3A and 3B show examples of XHTML-Print data according to the embodiment of the present invention.

FIG. 6 shows an example of layout data request according to the embodiment of the present invention.

FIG. 7 shows an example of XHTML-Print data request according to the embodiment of the present invention.

FIGS. 8A and 8B show examples of layout data according to the embodiments of the present invention

DETAILED DESCRIPTION

Hereinafter, an embodiment according to aspects of the present invention will be described with reference to the accompany drawings. It is noted that, although one exemplary embodiment will be described hereafter, various modifications and changes may be made by those skilled in this art without departing from the scope of the invention.

(System Configuration)

Figure 1:
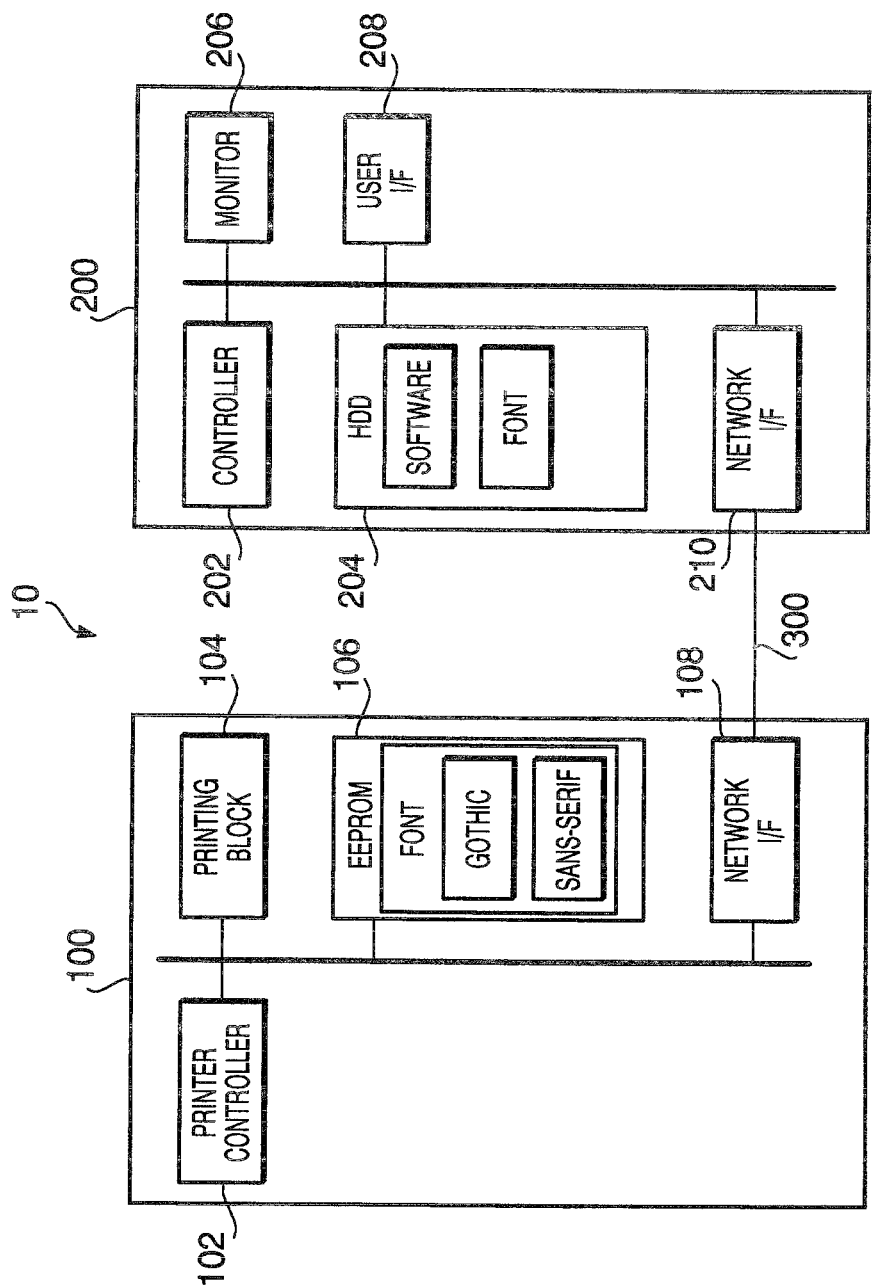
FIG. 1 is a block diagram showing a configuration of a printing system, which has a printer and a PC (personal computer), according to an embodiment of the present invention.

FIG. 1 is a block diagram showing a printing system 10, which includes a printer 100 and a terminal device 200 to which aspects of the present invention are applied. In this exemplary embodiment, a PC (personal computer) is employed as the terminal device 200 (hereinafter, the terminal device will also be referred to as the PC 200). The printing system 100 is configured such that the PC 200 is connected to the printer 100 through a LAN (Local Area Network) 300. Various data including print data are transmitted/received between the printer 100 and PC 200 mutually.

As shown in FIG. 1, the printer 100 has a printer controller 102, a printing block 104, an EEPROM (Electrically Erasable and Programmable Read Only Memory) 106, a network interface 108 (hereinafter, referred to as the network I/F 108). The printer controller 102 controls the entire operation of the printer 100. The printer controller 102 includes, for example, a CPU (Central Processing Unit), a ROM (Read Only Memory) and a RAM (Random Access Memory). The printing block 104 operates to print a print image based on the print data transmitted from the PC 200. The EEPROM 206 is a nonvolatile memory and stores font data. In the exemplary embodiment, the font data includes gothic font data and sand-serif font data.

The printer controller 102 executes various processes to execute various operations of the printer 100. Specifically, the various operations of the printer 100 are controlled by the CPU of the printer controller 102 according to programs stored in the ROM of the printer controller 102. In this exemplary embodiment, various data is stored in the RAM of the printer controller 102, and the RAM is accessed by the CPU.

The PC 200 has a controller 202, an HDD (Hard Disk Drive) 204, a monitor 206, a user interface (hereinafter referred to as user I/F) 208 and a network interface (hereinafter referred to as network I/F) 210. When the PC 200 receives an instruction for printing from the user through the user I/F 208, the controller 202 transmits a command for printing, which is data for instructing the printer 100 to execute printing, to the printer 100. The controller 202 is capable of generating a preview image data corresponding to the print image to be printed on a print sheet in accordance with the print data and displaying the same on the monitor 206. The controller operates by executing programs which are stored in the HDD 204. The HDD 204 also stores a plurality of kinds of font data. The monitor 206 displays variety of information including the preview image. The user I/F 208 includes a keyboard and a mouse. The network interface 206 is used for connecting the PC 200 to the LAN. It is noted that the PC 200 is similar to a generally used personal computer except that it is configured to execute particular functions described below.

(Communication Sequence Related to the Preview and the Printing Functions)

Figure 2:
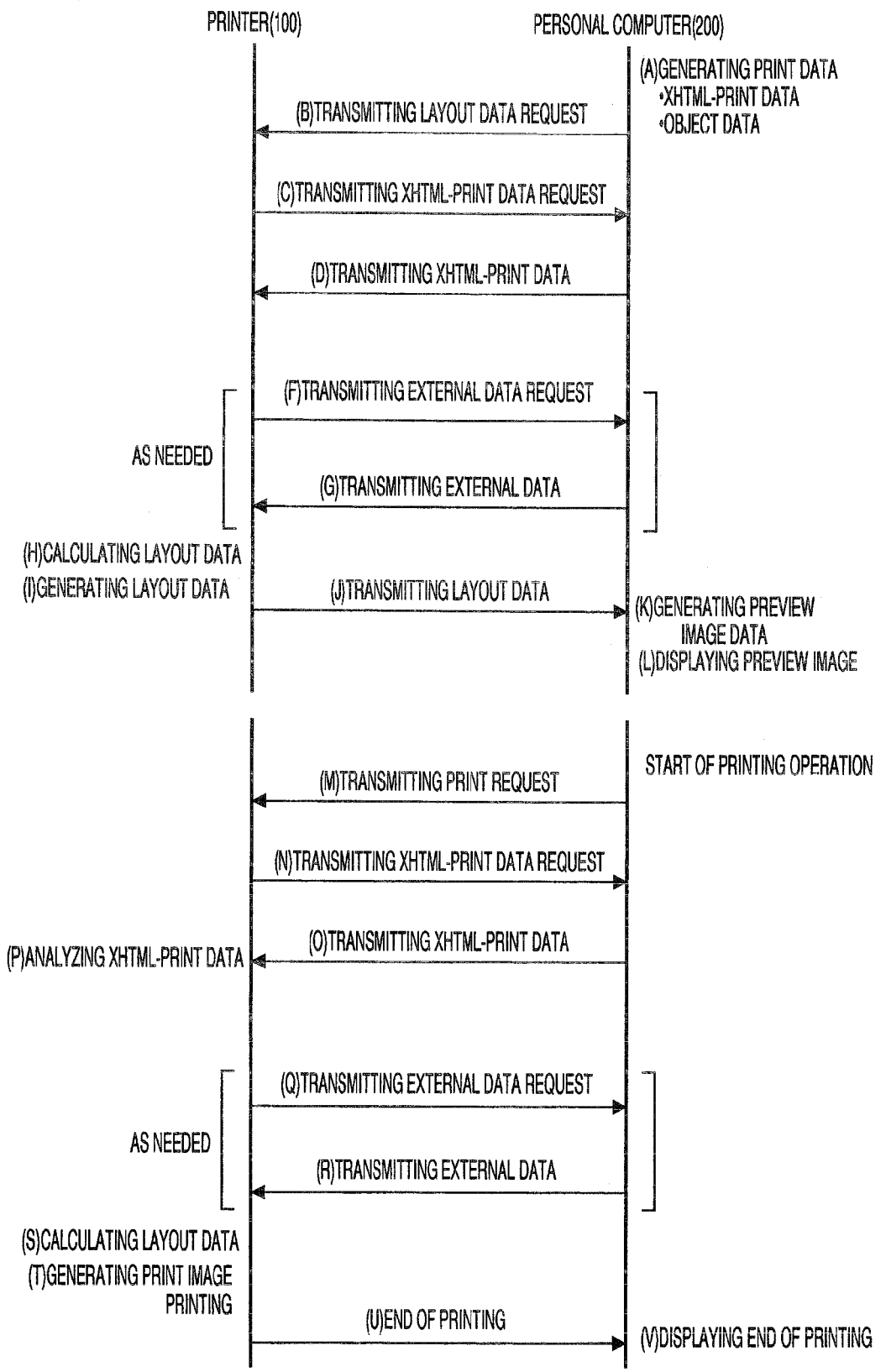
FIG. 2 shows a communication sequence between printer and the PC of the printing system according to the embodiment of the present invention.

FIG. 2 is a diagram showing data flows between the printer 100 and the PC 200 related to the display of the preview image in the PC 200 and the printing of the print data by the printer 100. It is noted that, in this exemplary embodiment, XHTML-Print (eXtensible HyperText Markup Language Print) data is used for the print data.

(Sequence Related to the Preview)

At first, the controller 202 of the PC 200 generates the print data using the software installed in the HDD 204 ((A) in FIG. 2). At this point, the print data is generated in the XHTML-Print form (hereinafter, referred to as XHTML-Print data). The XHTML-Print data can include, in addition to character string data, other types of data such as image data, which is stored in the HDD 204, as object data. In the following description, a case where the string data and the JPEG image data are included in the XHTML-Print data will be described as an example.

Figure 4:
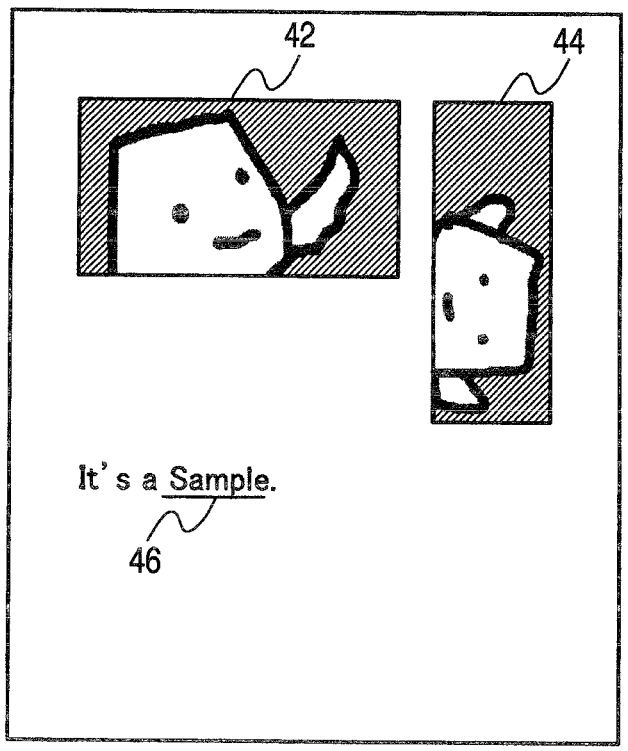
FIG. 4 shows an example of a preview image according to the embodiment of the present invention.
Figure 5A:
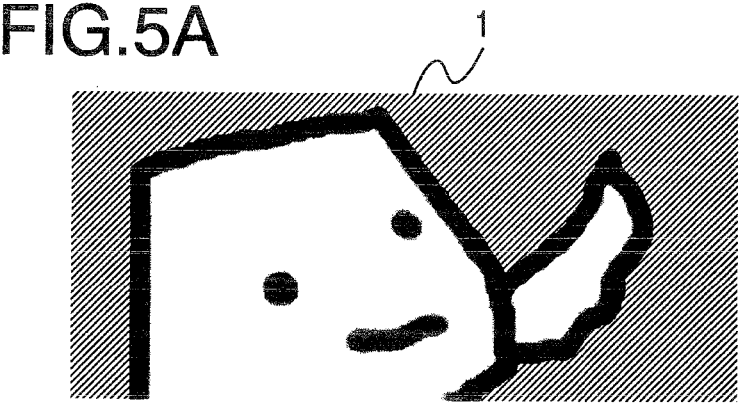
FIGS. 5A and 5B show image objects included in XHTML-Print data according to the embodiment of the present invention.
Figure 5B:
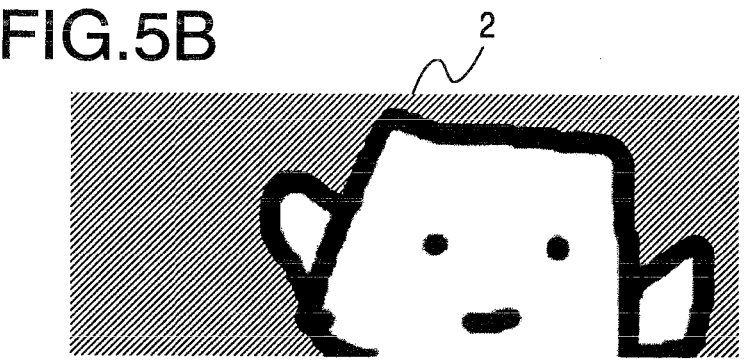

FIGS. 3A and 3B show examples of the XHTML-Print data according to the exemplary embodiment. FIG. 4 shows the preview image, which is generated based on the XHTML-Print data and represents the image to be printed on the print sheet. The preview image is displayed on the monitor 206. FIG. 5A shows an example of JPEG image data 1. The JPEG image data 1 is an image object 42 in FIG. 4 having a file name of "img1.jpg," which name is contained in the XHTML-Print data (see FIGS. 3A and 3B). FIG. 5B shows JPEG image data 2, which is an image object 44 having a file name of "img2.jpg." The file name "img2.jpg" is also contained in the XHTML-Print data (see FIGS. 3A and 3B). It is noted that the preview image (print image) to be displayed (to be printed) is defined by "body" tags ( defined as text between "<body>" tag and "</body>" tag) in FIGS. 3A and 3B. Therefore, in the following description regarding the preview image and print image, only the text between body tags will be described for brevity.

In FIG. 3A, a portion marked with a symbol (i) relates to the image object 42 in FIG. 4.

The second line of the portion (i) indicates that the print data to be print, is the "img1.jpg" (JPEG image data 1) stored in a device identified by an URL of "http: //192.168.1.2/." The first line of the portion (i) indicates that the "img1.jpg" (JPEG image data 1) is surrounded by a frame of which the line type is "solid line", the line thickness is "one pixel", and the line color is "black." It is noted that a text specifying the location and the size of the frame are not indicated in the portion (i).

A portion marked with a symbol (ii) relates to the image object 44 in FIG. 4. The second line of the portion (ii) indicates that the print data, which should be print, is the "img2.jpg" (JPEG image data 2) stored in the device identified by a URL of "http: //192.168.1.2/." The first line of the portion (ii) indicates that the "img2.jpg" (JPEG image data 2) is surrounded by a frame of which the line type is "solid line," the line thickness is "one pixel," the line color is "black," and also indicates that the frame and the JPEG image data 2 are rotated 90 degrees in a clockwise direction. It is noted that the text specifying the location and the size of the frame are not indicated in the portion (ii), similarly to the portion (i). When the frame is formed to surround the objects such as JPEG image data 1 or JPEG image data 2, instead of designating the same in the XHTML-Print data to directly specify the line type etc., a style sheet may be employed. In such a case, the style sheet may be stored in an external device, which could be the PC 200 or another device, configured to communicate with the printer 100, and the print controller 102 executes an operation to acquire the style sheet.

The portion marked with a symbol (iii) relates to the character string object 46 in FIG. 4. Specifically, the portion (iii) specifies that the font "Gothic" is used or the font "sans-serif," which is one of the standardized fonts in the XHTML, is used for character strings data ("It's a Sample") of the string object 46 if the printer 100 does not store the font "Gothic." It is noted that a character string "Sample" is attributed with an underline since "Sample" is sandwiched between tags <u> and </u>. It is noted that a description in a frame at an upper right corner of FIG. 3A is an explanation of the commands included in the XHTML-Print data, and is not constitute the text/data of the XHTML-Print data.

FIG. 3B is XHTML-Print data including the text specifying the location and the size of the frame for the JPEG image data 1, which are not specified in FIG. 3A. Portions marked with (i'), (ii') and (iii) in FIG. 3B correspond to portions (i), (ii) and (iii) in FIG. 3A, respectively. In the portion (i') of FIG. 3B, in addition to the text shown in the portion (i) of FIG. 3A, a text defining the location and the size "top: 16 mm; left: 11 mm; width: 146 mm; height: 30 mm" of the frame for the JPEG image data 1 is added. The added portion defines that a reference location of the frame is 16 mm from the upper side of the print sheet and 11 mm from the left-hand side of the print sheet (i.e., the upper-left corner of the frame should be located at the reference location), and the width of the frame is 146 mm and the height of the frame is 30 mm. Similarly, in FIG. 3B, a text defining the location and the size of the frame for the JPEG image data 2 is indicated as "top: 16 mm; left: 164 mm; width: 20 mm; height: 148 mm" in the second line at the portion (ii'). In these examples, the text at the portion (iii) in FIG. 3B and the text at the portion (iii) of FIG. 3A are the same.

After generating the XHTML-Print data, the controller 202 transmits layout data request, which is data requesting the printer 100 to generate layout data, to the printer 100 through the network I/F 210 ((B) in FIG. 2). FIG. 6 shows an example of the layout data request. The texts between "body" tags (i.e., the texts sandwiched between "<body>" and "</body>") in the layout data request are referred to for generating the layout data. Therefore, the description between body tags in the layout data request will be described below. It is noted that the layout data request is described according to the XML (Extensible Markup Language) standard which is widely used as a Markup Language.

The texts in the portions (i) and (viii) in FIG. 6 indicate that the data is the layout data request. The text at the portion (i) defines the start of description of the layout data, and the text at the portion (viii) defines the end of the texts of the layout data request.

The text at the portion (ii) defines that the file type of the print data contained in the layout data request is of the XHTML-Print data.

In this example, the text of the portion (iii) defines a so-called "N-in-1" printing. If a value "1" is indicated at the portion (iii), data for one page is printed on a one print sheet. If a value "2" is indicated at the portion (iii), data for two pages are printed on one print sheet. If a value "n" is indicated at the portion (iii), data for n pages are printed on one print sheet.

The text at portion (iv) specifies an orientation of the print sheet. If the text at the portion (iv) is "portrait," the print sheet is used such that a longer side is the vertical side and a shorter side is the horizontal side. If the text at the portion (iv) is "landscape," the print sheet is used such that the shorter side is the vertical side and the longer side is the horizontal side.

The text at the portion (v) specifies the size of the print sheet. In the example shown in FIG. 6, a size "A4 (210 mm in width×297 mm in height)" is specified.

The text at the portion (vi) specifies the size of the preview image data. In the example shown in FIG. 6, the size is defined as "424 pixels in width×600 pixels in height," of which the aspect ratio is approximately equal to that of the A4 size.

The text at the portion (vii) specifies the location of the XHTML-Print data. According to the example shown in FIG. 6, the XHTML-Print data, which serves as basis for the layout data, is "print1.html" which can be retrieved from a device located at "192.168.1.2" with HTTP (Hyper Text Transfer Protocol).

When the printer 100 receives data, the printer controller 102 determines whether the received data is the layout data request. If the received data is the layout data request, the printer controller 102 transmits a XHTML-Print data request to the PC 200, which is addressed to "192.168.1.2" indicated at the portion (vii) in FIG. 6, in order to request the PC 200 to transmit the XHTML-Print data ("print1.html" specified at the portion (vii) in FIG. 6) which is subjected for generating the layout data ((C) in FIG. 2). FIG. 7 shows the XHTML-Print data request requesting for the "print1.html." If the received data is a print data request, the printer controller 102 executes a process (N) and subsequent processes shown in FIG. 2.

When the controller 202 receives the XHTML-Print data request ((D) in FIG. 2), the controller 202 transmits the XHTML-Print data to the printer 100 through the network I/F 210. It is noted that the XHTML-Print data transmitted to the printer 100 is made in a process (A) in FIG. 2. The printer controller 102 analyzes the XHTML=Print data received from the PC 200 and judges whether other data is necessary for generating the layout data. If the printer controller 102 judges that other data is necessary, the print controller 102 transmits an external data request to the PC 200 through the network I/F 108 ((F) in FIG. 2). In response to the external data request, the controller 202 transmits the external data to the printer 100 through the network I/F 210 ((G) in FIG. 2). When the printer controller judges that no other data is necessary, processes (F) and (G) shown in FIG. 2 will not be executed.

For example, the XHTML-Print data shown in FIG. 3A specifies that the JPEG image data 1 and 2 should be surrounded by the frames composed of solid black lines having a thickness of one pixel. However, the size of the frames is not specified by the XHTML-Print data shown in FIG. 3A. Therefore, it is necessary that the printer controller 102 obtains the JPEG image data 1 and 2 to be surrounded by the frames and calculates the size of the JPEG image data 1 and 2 for determining the size of frames. It is noted that the size of the JPEG image data 1 and 2, for example, may be obtained from the header information of the JPEG image data 1 and 2. In addition, when the style sheet defines the line type and the like, the printer controller 200 obtains the style sheet from the PC 200.

As described above, when the size of the frame is not specified in the XHTML-Print data, the printer controller 102 transmits the external data request to the PC 200 in order to request the PC 200 to transmit the JPEG image data i and 2 ((F) in FIG. 2), and then receives the JPEG image data 1 and 2 transmitted from the PC 200. In contrast, when the printer controller 102 receives the XHTML-Print data as shown in FIG. 3B, which specifies the location and the size of the frames, the printer controller 102 can identify the location and the size of the frames based on the XHTML-Print data. Accordingly, when the printer controller 102 receives the XHTML-Print data as shown in FIG. 3B, the processes (F) and (G) shown in FIG. 2 will not be executed since no other data is necessary for generating the layout data. It is noted that, for example, if only the portion (iii) in FIG. 3A (i.e. the character strings data) is included between the "body" tags, the printer controller 102 also determines that no other data is necessary for generating the layout data.

The printer controller 102 calculates the layout (locations) of the JPEG image data 1 and 2 assuming that the XHTML-Print data is printed, based on the layout data request and the XHTML-Print data ((H) in FIG. 2). Then, the printer controller 102 generates the layout data based on the calculation result ((I) in FIG. 2). Then, the printer controller 102 transmits the layout data to the PC 200 through the network I/F 108 ((J) in FIG. 2). After receiving the layout data, the controller 202 generates the preview image data by executing a rasterizing process based on the received layout data ((k) in FIG. 2) and displays the preview image on the monitor 206 ((L) in FIG. 2).

FIG. 8A and FIG. 8B show examples of layout data. Since the layout is specified by the texts between the "body" tags, the description will be given regarding the portion between the "body" tags. FIG. 8A shows the layout data including the background image data (cf. background image 90 in FIG. 9) which represents a background of the preview image. In the background image data, a vector data related to the frame described in the XHTML-Print data is developed. The texts at the portions (i) and (x) in FIG. 8A are responses to the layout data request (see (B) in FIG. 2), and the portion (i) in FIG. 8A defines the start of the portion constituting the response, and the portion (x) in FIG. 8A defines the end of the portion constituting the response. In addition, texts at the portions (ii) and (ix) specify that the texts at the portions (iii) to (viii) represent the layout data. The portion (iii) defines the start of the texts constituting the layout data, and the portion (viii) defines the end of the texts of the layout data.

Figure 9:
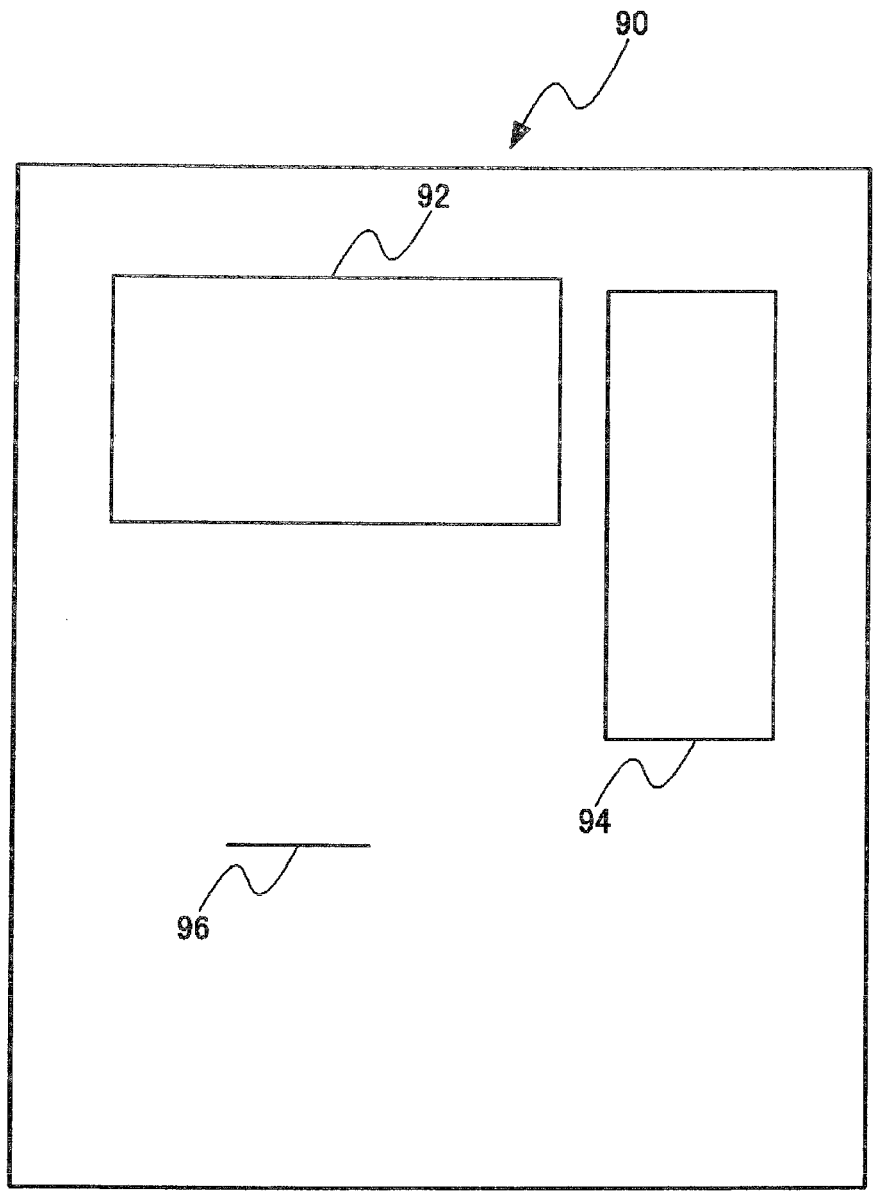
FIG. 9 shows a background image which is generated based on background image data included in the layout data shown in FIG. 8A.

The description at the portion (iii), which corresponds to the size of the preview image specified at the portion (vi) shown in FIG. 6, which specifies that the size of the preview image applied to the layout data shown in FIG. 8A or 8B is "424 pixels in width×600 pixels in height." The description of at the portion (iv) specifies the background image data. The first line of the portion (iv) specifies the reference position (x=0 y=0), the size (w (width)=424 pixels, h (height)=600 pixels), the type of the background image data (jpeg/inline) and the data size (datasize=1024 byte) of the background image. The first line of the portion (iv) specifies that the background image, which is JPEG data (described at the second and subsequent lines at the portion (iv)) having the data size of 1024 bytes, is allocated within an area defined by the reference position (x=0 y=0) and the size (w (width)=424 pixels, h (height)=600 pixels). The descriptions at the second and subsequent after lines at the portion (iv) indicate JPEG data (the background image data) as the data to be displayed as the background image. FIG. 9 shows an example of a background image 90. As is clearly known from FIG. 9, the data specified as the vector data in the print data (i.e., a frame line 92 surrounding the JPEG image data 1, a frame line 94 surrounding the JPEG image data 2 and an underline 96 for the character strings data "sample") are developed in the background image data.

The text at the portion (v) describes the JPEG image data 1. Specifically, the text at the portion (v) specifies that the JPEG image data 1 (file name: img1.jpg) which is stored in a device at an address of "http://192.168.1.2" is allocated in an area identified by the reference position of "X=22 Y=32" and the size of "300 pixels in width×60 pixels in height." The text at the portion (vi) describes the JPEG image data 2 (file name: img2.jpg) which is stored in a device at an address of "http://192.168.1.2" is allocated in an area identified by the reference position of "X=332 Y=32" and the size of "40 pixels in width×300 pixels in height." It is noted that "r=90" at the portion (vi) specifies that the JPEG image data 2 is rotated by 90 degrees in clockwise, which corresponds to the text of "image-orientation: 90 deg" in the XHTML-Print data shown in FIG. 3.

The text at the portion (vii) are related to a character object 46. Specifically, the portion (vii) specifies that the character object 46 has black color, which is defined with "col=000," the character object 46 has a size of 24 pixels in height, and is located at "X=22 Y=344" from the reference position, and the Gothic font is used. It is noted that the color of the character object 46 is defined with 3 digits value of a parameter "col," the digits represent values of RGB (Red, Green, Blue) components, respectively. In this example, each digit has a value of zero, which means the each of RGB components has a value of zero. Therefore, "col=000" means black color. The width of each character is defined at the portion (viii) which will be described below. Although the color is defined with the RGB components, it is not necessarily be limited that the color of the character is defined with RGB values. The color of the character may be defined, for example, with CMYK value.

The text at the portion (viii) defines the arrangement of each character of the character object 46. For example, the text in the first line at the portion (viii) defines a character "I" of the text "It's simple." The character (letter) "I" is arranged at a position of "X=22" with a width of 12 (w=12). Considering the texts in the portions (vii) and (viii), the character "I" is black, Gothic font, and is arranged within an area of 24 pixel in height and 12 pixels in width, the area (the upper-left corner of the area) being located at a position "X=22, Y=34." The other characters following the character "I" are also arranged within respective areas based on the definitions at the portions (vii) and (viii), with the black color and the Gothic font. Each character defined in the second line to twelfth line at the portion (viii) is arranged in a similar manner. The detailed explanation regarding the definition of the characters in the second line to twelfth line at the portion (viii) is omitted since it is analogous.

FIG. 8B shows another example of the layout data. In FIG. 8B, different from the layout data shown in FIG. 8A, the frame line 92, the frame line 94 and the underline 96 for the text "sample" are defined as vector data, similarly to the definition in the XHTML-Print data. Thus, the text regarding the background image data at the portion (iv) in FIG. 8A is omitted in the layout data shown in FIG. 8B. Instead, in FIG. 8B, the portion (iv') defining the frame line 92 surrounding image object 42 (the JPEG image data 1), the portion (iv") defining the frame line 94 surrounding the image object 44 (the JPEG image data 2) and the portion (iv'") defining the underline 96 for the text "sample" are added in the layout data shown in FIG. 8B.

For example, the text at the portion (iv') defines a line box (LINEBOX) which is drawn with the line thickness of "one pixel" (linew=1) and the line color of "black" (col=000), the upper-left corner being located at the reference position of "X=22 Y=32," and the size of the line box being "300 pixels in width (W=300)×60 pixels in height (h=60)."

The text at the portion (iv") defines a line box (LINEBOX) which is drawn with the line thickness of "one pixel" (linew=1) and the line color of "black" (col=000), the upper-left corner of the line box being located at a position "X=332 Y=32" and the size of the line box being "40 pixels in width (W=40)×300 pixels in height (h=300)."

The text at the portion (iv'") defines a line (LINE) which is drawn with the line length of 98 pixels in x direction (stepX=98), the line thickness of "one pixel" (linew=1), the line color of "black" (col=000), starting from a position "X=121 Y=358." Since the other portions in FIG. 8B are similar to those in FIG. 8A, description thereof will not be presented for brevity.

(Sequence Related to the Printing)

When a user of the PC 200 has reviewed the preview image showing a status where the XHTML-Print data is printed on the print sheet, and input a print instruction through the user I/F 208, the controller 202 transmits a print request to the printer 100 through the network I/F 210 ((M) in FIG. 2). Upon receipt of the print instruction, the printer controller 102 judges which data is received from the PC 200. When the printer controller 102 determines that the received data is the print request, the printer controller 102 transmits the XHTML-Print data request to the PC 200 through the network I/F 108 ((N) in FIG. 2). In response to the XHTML-Print data request, the controller 202 of the PC 200 transmits the XHTML-Print data to the printer 100 through the network I/F 210 ((O) in FIG. 2). The communication between printer 100 and PC 200 indicated by (N) and (O) shown in FIG. 2 are the same as (C) and (D) as mentioned above.

The printer controller 102 analyses the XHTML-Print data after receiving it from the PC 200 ((P) in FIG. 2), and judges whether additional data is necessary for printing besides the XHTML-Print data. For example, if the XHTML-Print data includes a text referring to image data (e.g., refer to the portion (ii) in FIG. 3A), it is necessary to obtain the image data to execute printing. In such a case, the print controller 102 transmits the external data request to the PC 200 through the network I/F 108 (process (Q) in FIG. 2). Then, the print controller 102 receives the external data which is transmitted ((R) in FIG. 2) from+the PC 200 in response to the external data request. According to the examples shown in FIGS. 8A and 8B, the print controller 102 receives the JPEG image data 1 and 2. In another case, the print controller 102 may receive the style sheet. If the printer 100 can carry out printing based on the XHTML-Print data, the processes (Q) and (R) in FIG. 2 are not executed by the printer controller 102. Next, the printer controller 102 calculates the layout of the image data using the external data process (S) in FIG. 2), which is necessary for the printing, and received from the PC 200. It is noted that processes (P) to (S) shown in FIG. 2 are the same as the processes (E) to (H) mentioned above, respectively.

After calculating the layout based on the XHTML-Print data etc., the printer controller 102 generates bitmap data (indicated as "print image" in FIG. 2) and prints the bitmap data with the printing block 104 (process (T) in FIG. 2). When the printing operation is completed, the printer controller 102 transmits printing completion data indicating completion of printing to the PC 200 through the network I/F 108 (process (U) in FIG. 2). The controller 202, which received the printing completion data, displays an image indicating that the printing operation has been completed on the monitor 206 (process (V) in FIG. 2).

It is noted that, in the above-described embodiment, the PC 200 transmits the layout data request and the XHTML-Print data, as distinct pieces of data, to the printer 100 according to UPnP (Universal Plug and Play). This configuration can be modified such that both the layout data request and the XHTML-Print data may be combined into one piece of data. In such a case, a network traffic can be improved because the information included in both data is transmitted by one transmission.

In the above-described embodiment, after the printer 100 receives the print request and data necessary for printing (i.e., the XHTML-Print data and the like) is transmitted from the PC 200 to the printer 100, the analysis of the XHTML-Print data and the calculation of the layout are performed again in the printer 100. However, if the printer 100 is configured to hold the XHTML-Print data and the analysis/calculation results obtained when the preview image data was generated, the printer 100 needs not perform the same processes again. Such a configuration is advantageous in terms of the network traffic and/or efficiency of processes. It is noted that, for example, when the printer 100 receives the print request, the printer 100 may compare contents of the layout data request with contents of the print request in order to judge whether the preview image data was generated for the print request in advance. Specifically, the printer 100 compares the texts of the portion (ii) to the portion (vii) in the layout data request with the corresponding texts in the print request.

(Layout Data Generation Process Performed in Printer 100)

Figure 10:
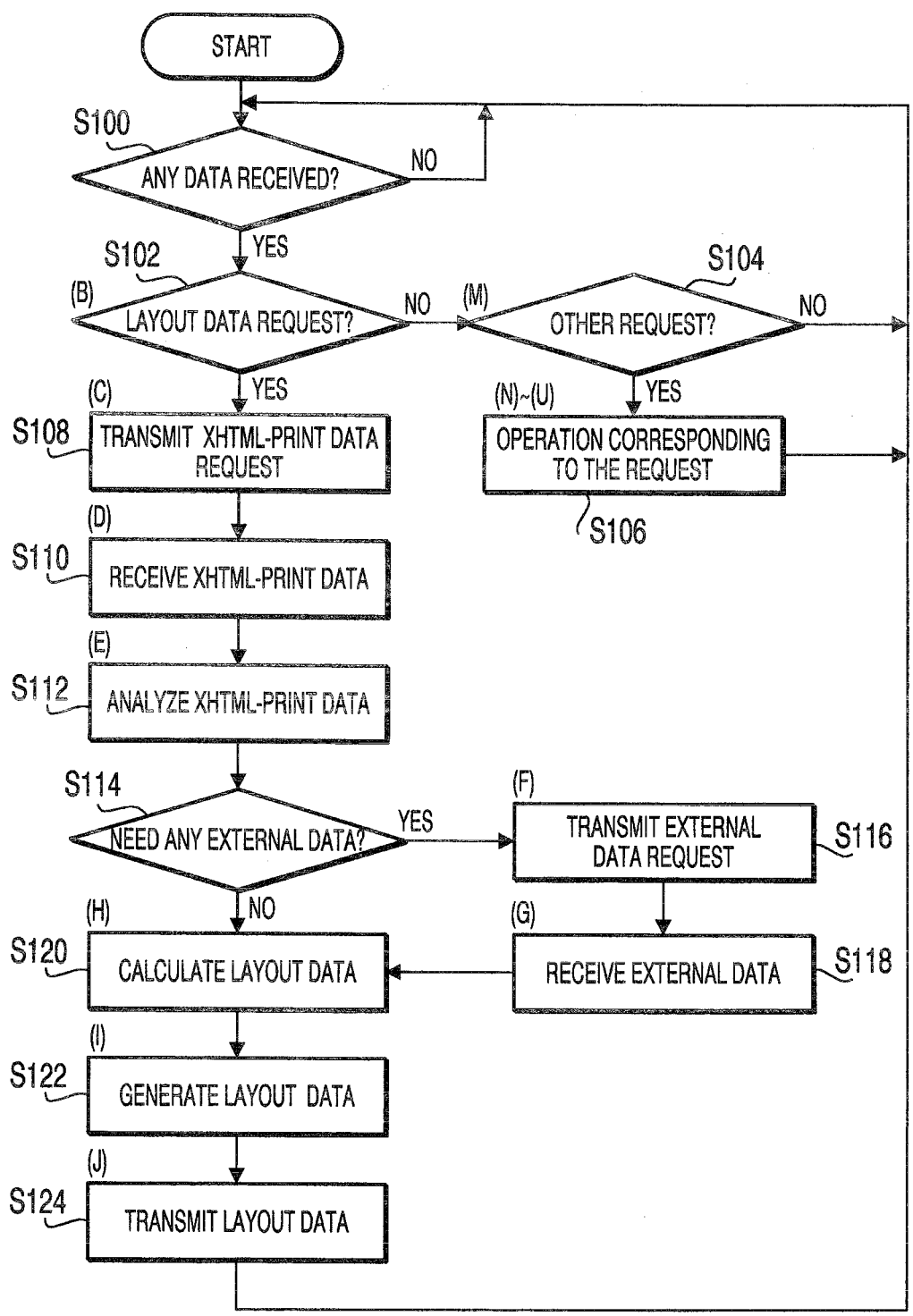
FIG. 10 shows a flowchart illustrating a layout data generation process performed in the printer according to the embodiment of the present invention.

FIG. 10 shows a flowchart illustrating a layout data generation process, which is executed by the printer controller 102. It is noted that alphabetical symbols in parenthesis, which are indicated at respective steps corresponding to those indicated in FIG. 2.

When the layout data generation process is started, the printer controller 102 waits until the printer controller 102 receives data/request from the PC 200 (S100: NO). When the printer controller 102 receives data/request (S100: YES), the printer controller 102 judges whether the received data is the layout data request (cf. FIG. 6) (S102). When the received data/request is not the layout data request (S102: NO), the printer controller 102 judges whether the received data/request is data/request corresponding to another process (i.e., a process other than the layout generation process) (S104). If the received data/request corresponds to another process (S104: YES), the printer controller 102 performs the process corresponding to the received data/request (S106). If the received data/request is not related to another process (S104: NO), the control returns to S100, and the printer controller 102 waits for receipt of data/request (S100: NO).

For example, when the data/request received in S100 is the print request (S102: NO, S104: YES), the printer controller 102 performs the printing process (S106). In the printing process, the process (M) and succeeding processes shown in FIG. 2 are performed. Since the printing process is a well-known process, the detailed explanation is omitted for brevity.

When the data/request received in S100 is the layout data request (cf. FIG. 6) (S102: YES), the printer controller 102 extracts an address of the source device, which has transmitted the request, and transmits the XHTML-Print data request (cf. FIG. 7) to the source device having the extracted address through the network I/F 108 and the LAN 300. In the exemplary embodiment, the address of PC 200 is the extracted address (i.e., a destination address. When the XHTML-Print data (erg., FIG. 3A or 3B) is received (S110) after transmission of the XHTML-Print data request in S108, the printer controller 102 analyzes the received XHTML-Print data (S112), and judges whether additional data (external data) is necessary in order to generate the layout data (S114). If the external data is necessary (S114: YES), the printer controller 102 transmits the external data request to a device that stores the external data through the network I/F 108 and the LAN 300 (S116). It is noted that the address of the device that stores the external data can be identified referring to the XHTML-Print data.

For example, in the example shown in FIG. 3A, "img1.jpg" (JPEG image data 1) and "img2.jpg" (JPEG image data 2) (cf. FIGS. 5A and 5B) are necessary for generating the layout data. Thus, the printer controller 102 transmits the external data request to the device storing the JPEG image data 1 and 2 (in this exemplary embodiment shown in FIG. 3A, the addresses (URLs) are "http://192.168.1.2/img1.jpg" and "http://192.168.1.2/img2.jpg"). If a style sheet is necessary, the printer controller 102 transmits a request for transmission of the style sheet to a device that stores the style sheet, the address being derived from the XHTML-Print data.

If the print controller judges that no external data is necessary (S114: NO), or if the printer controller 102 has received all the necessary external data (S118), the printer controller 102 calculates a layout based on the XHTML-Print data and the external data, if any, received in S118 (S120), and generates the layout data (cf. FIG. 8A or 8B) (S122). Then, the printer controller 102 transmits the layout data to the source device from which the layout data request was transmitted through the network I/F 108 and the LAN 300 (S124). Thereafter, the control returns to S100 and waits until the next data/request is received (S100).

(Preview Image Display Processing Performed in the PC 200)

Figure 11:
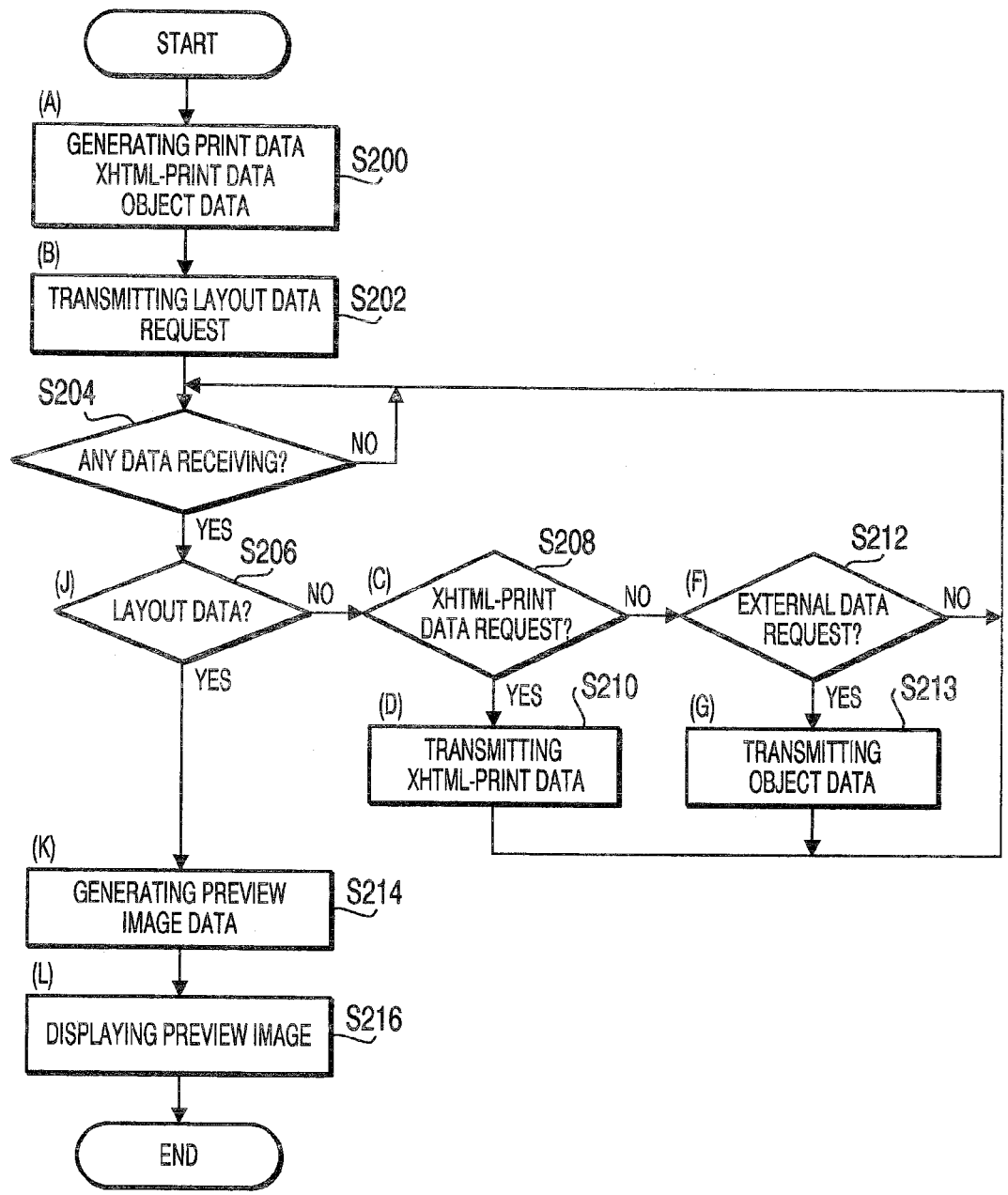
FIG. 11 shows a flowchart illustrating a preview image display process performed in the PC according to the embodiment of the present invention.

FIG. 11 shows a flowchart illustrating a preview image displaying process performed by the controller 202 of the PC 200. The alphabetical symbols in parenthesis in FIG. 11 correspond to those indicated in FIG. 2.

As shown in FIG. 11, the controller 202 generates the XHTML-Print data and the image data that are subjected to printing (S200). When a user of the PC 200 instructs display of the preview image through the user I/F 208 and the controller 202 detests the thus input instruction, the controller 202 transmits the layout data request (cf. FIG. 6) to the printer 100 through the network I/F 210 and the LAN 300 (S202). It should be noted that the controller 202 has preliminarily detected that the printer 100 is available on the LAN 300. Then, the controller 202 waits until data/request is received (S204: NO).

When the controller 202 receives data/request (S204: YES), the controller 202 judges whether the received data/request is the layout data (cf. FIG. 8A or 8B) (S206). When the received data/request is not the layout data (S206: NO), the controller 202 judges whether the received data/request is the XHTML-Print request (cf. FIG. 7) (S208). If the received data/request is the XHTML-Print request (S208: YES), the controller 202 transmits the XHTML-Print data (cf. FIG. 3) to the printer 100 through the network I/F 210 and the LAN 300.

If the received data/request is not the XHTML-Print request (S208: NO), the controller 202 judges whether the received data/request is the external data request (S212). If the received data/request is the external data request (S212: YES), the controller 202 transmits the external data to the printer 100 through the network I/F 210 and the LAN 300 (S213). In this embodiment, as described above, a request for transmission of the image data "img1.jpg" (JPEG image data 1) and "img2.jpg" (JPEG image data 2) (and/or the style sheet) is received from the printer 100. If the received data/request is not the external data request (S212: NO), the controller 202 determines that the received data/request is not related to the preview image generation process, and returns to S204 to wait for reception of next data/request.

If the data received in S204 is the layout data (cf. FIG. 8A or 8B) (S206: YES), the controller 202 analyzes the received layout data, and generates preview image data based on the layout data (S214). Then, the controller 202 displays the preview image data on the monitor 206 (cf. S216/FIG. 4), and terminates the process.

Figure 12:
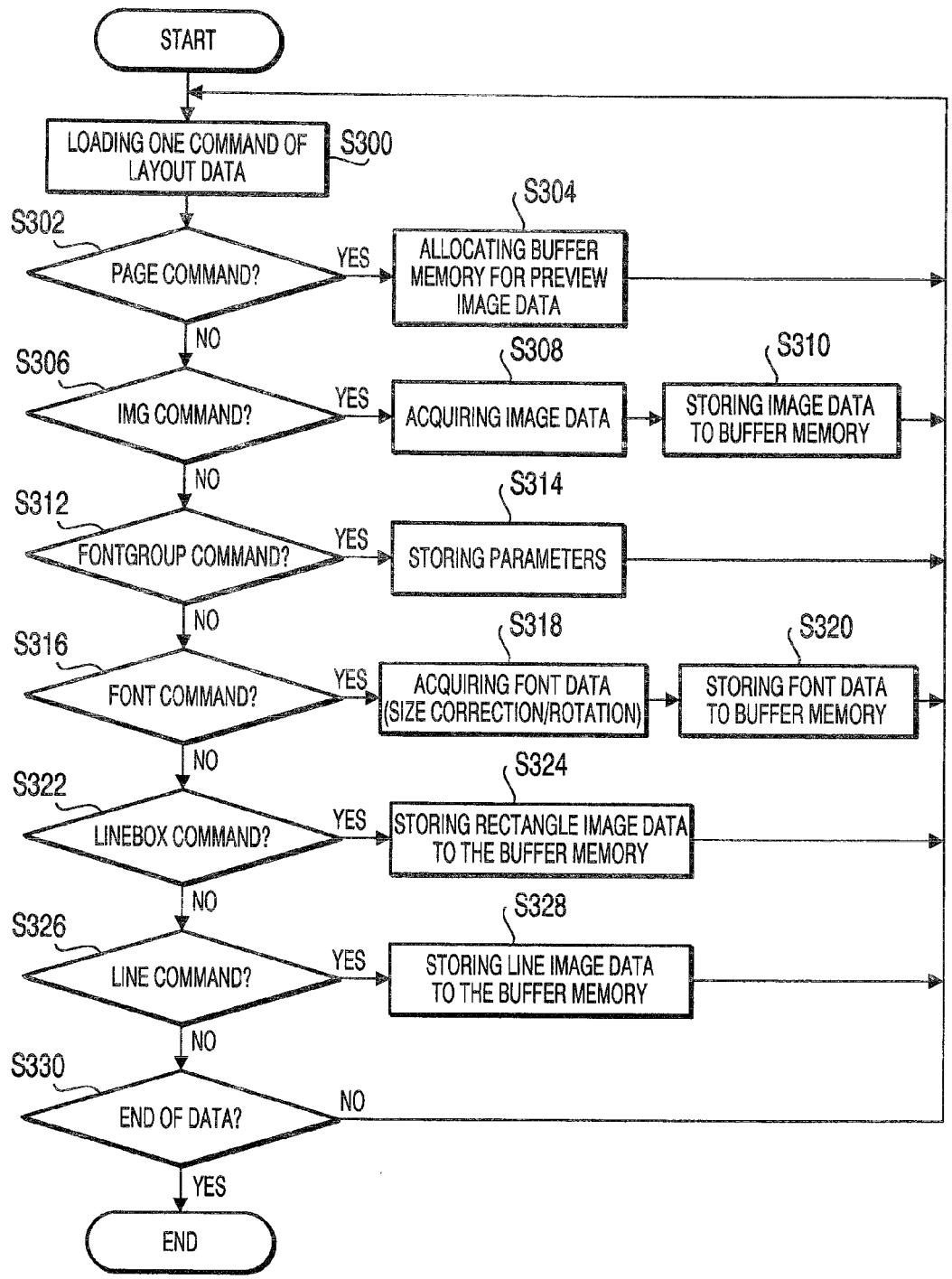
FIG. 12 shows a flowchart illustrating another preview image display processing which can be performed in the PC according to the embodiment of the present invention.

FIG. 12 shows a flowchart illustrating a preview image data generating process which illustrates S214 of the preview image display process shown in FIG. 11. When the preview image data generation process is started, the controller 202 reads one command from the layout data (cf. FIG. 8A or 8B) (S300). In the case of the layout data of FIG. 8A, all the commands included in the portions (iii)-(viii) of the layout data are read in this order.

In S302, the controller 202 judges whether the command read in S300 is a "PAGE" command (cf. the portion (iii) of FIGS. 8A and 8B) (S302). If the command is the "PAGE" command (S302: YES), the controller 202 allocates a buffer for the preview image data on the RAM of the controller 202 (S304). When the command is not the "PAGE" command (S302: NO), the controller 202 judges whether the command is an "IMG" command (cf. the portions (iv), (v) and (vi) of FIG. 8A, and the portions (v) and (vi) of FIG. 8B) (S306). If the command is the "IMG" command (S306: YES), the controller 202 obtains the image data associated with "IMG" command (S308). For example, when the data path (address) of the image data is specified by "src" attribute, the controller 202 retrieves the image data based on the specified data path. According to the example of the portions (v) and (vi) shown in FIGS. 8A and 8B, the "img1.jpg (JPEG image data 1)" and the "img2.jpg (JPEG image data 2 )" are acquired. The concrete steps for obtaining the image data are executed at the processes (F) and (G) shown in FIG. 2. According to the portion (iv) shown in FIG. 8A, the controller 202 acquires the JPEG data, as a background image, indicated in the portion (iv) of FIG. 8A, from the layout data directly. The controller 202 develops a bitmap based on the acquired image data. In addition, when another process (e.g., scaling up, scaling down or rotation) is instructed, the controller 202 performs the instructed process. The controller 202 stores the image data (bitmap form), which is developed and/or processed, in an assigned place of the buffer for the preview image that is allocated in S304 (S310). If the layout data includes portion (vi) in FIGS. 8A and 8B, a rotation process is performed to the bitmap-developed JPEG image data 2 to rotate the bitmap image by 90 degrees clockwise.

If the command is not the "IMG" command (S306: NO), the controller 202 judges whether the command is a "FONT-GROUP" command (cf. the portion (vii) in FIG. 8A or 8B) (S312). When the command is the "FONTGROUP" command (S312: YES), the controller 202 stores a parameter which is described as text regarding this command on the RAM (S314). When the command is not the "FONTGROUP" command (S312: NO), the controller 202 judges whether the command is a "FONT" command (cf. the portion (viii) in FIG. 8A or 8B) (S316). If the command is the "FONT" command (S312: YES), the controller 202 retrieves font data from the HDD 204 and develops a bitmap of the font data. The controller 202 enlarges, reduces, and/or rotates the font data that is developed. Then, the controller 202 stores the font data (bit map form), which is developed and/or processed, in the assigned place of the buffer for the preview image that is allocated in S304 (S320).

Meanwhile, even if the font data installed in the printer 100 and the font data installed in the PC 200 are the same (e.g., Gothic), aspect ratios thereof may be different from each other. That is, even if the font names are the same, there may be a case where certain characters of the font data of the PC 200 may be wider than the corresponding characters of the font data of the printer 100. In such a case, characters of the font data of the PC 200 may not be arranged within a region specified by the layout data. To deal with such a problem, the "FONT" command is configured to reduce the size of the characters arranged in the frame are reduce (S318). If the size of the characters of the font of the PC 200 are smaller than the characters of the font of the printer 100, the characters may be enlarged so as to meet the area defined by the layout data (S318). Further, if the orientation of the print sheet is "landscape," the characters are rotated by 90 degrees in S318.

When the command is not the "FONT" command (S316: NO), the controller 202 determines whether the command is a "LINEBOX" command (cf. the portions (iv') and (iv") in FIG. 8B) (S322). When the command is the "LINEBOX" command (S322: YES), the controller 202 draws a rectangle image as specified by the command at a position in the preview image buffer that has been allocated in S304, in accordance with the "LINEBOX" command (S324). When the command is not the "LINEBOX" command (S322: NO), the controller 202 judges whether the command is a "LINE" command (cf. the portion (iv''') in FIG. 8B) (S326). If the command is the "LINE" command (S326: YES), the controller 202 draws a line as specified by with the "LINE" command at the specified location of the preview image buffer that is allocated in S304 (S328).

When the command is not the "LINE" command (S326: NO), the controller 202 judges whether the layout data has been processed (i.e., the controller 202 judges whether the last command of the layout data has been read) in S330. If all the commands of the layout data have been processed (S330: NO), the controller 202 terminates the process. If there remains an unread command (S330: NO), the controller 202 returns the process to S300, reads the next command and executes the succeeding steps again. It is noted that, after having performed the steps S304, S310, S314, S320, S324 and S328, the controller 202 returns the process to S300, and reads the next command.

It is noted that, in the above-described embodiment, the PC 200 is employed as the terminal device of the printing system 10. However, the configuration of the printing system 10 needs not be limited to the above-described exemplary embodiment and can be modified such that, digital electrical appliances such as a digital television set or variety of information processing devices may be alternatively or optionally employed in the printing system 10.

In the above-described embodiment, the print data includes the object location data for the image object. This configuration can be modified such that the print data includes the object data.

In the above-described embodiment, for example at the portion (vi) in FIG. 8A or 8B, an area is defined by a starting point and an object size. This configuration can be modified such that an area is defined by the starting point and an end point of the area. In the above-described embodiment, JPEG image data (object data) itself is used as external data. This configuration can be modified such that only, a header portion of JPEG image data (object data)is used as the external data.

Hereinafter, advantageous effects based on the configuration (process) of the embodiment will be described.

Because the printer 100 does not generate the preview image data, it is possible to reduce a load to the printer 100 required for generating the preview image data.

An algorithm similar to that for executing a printing operation can be used for making the printer 100 generate the layout data in accordance with the XTML-Print data. Further, since the PC 200 generates the preview image data based on the layout data that is generated by the printer 100, the PC 200 can display the preview image that precisely corresponds to the image formed by the printer 100 on the print sheet.

Thus, according to the embodiment, a preview image which fully correspond to an image that would be printed on a print sheet can be obtained, while reducing the load to the printer 100.

When the layout data defines an object location an area in which the object is allocated, it is possible to specify the location of the object precisely.

According to the embodiment, since the layout data is text data (i.e., HML data), it is not necessary to transmits large-sized data such as data including image data from the printer 100 to the PC 200.

What is claimed is:
1. A printing system comprising:
a printer; and
a terminal device configured to communicate with the printer,
wherein the terminal device comprises:
an interface configured to communicate with the printer;
a display;
a processor electronically coupled to the interface and the display; and a memory storing instructions that, when executed by the processor, cause the terminal device to:

transmit print data to the printer, the print data including location data representing a particular location where image data representing an object is stored, the particular location being different from the printer and the terminal device;

transmit a layout data request to the printer, the layout data request including a request for requesting the printer to transmit layout data to the terminal device;

receive the layout data generated by the printer; and generate a preview image data based on the layout data, wherein the printer comprises:

an interface configured to communicate with the terminal device;

a processor electrically coupled to the interface; and a memory storing instructions that, when executed by the processor, cause the printer to:

receive the print data from the terminal device;

receive the layout data request from the terminal device;

transmit, in response to receipt of the layout data request, an external data request to the particular location in accordance with the location data included in the print data;

receive external data from the particular location in response to the external data request, the external data including size data representing a size of the object, the size data being included in a header of the image data;

generate area specifying data specifying a particular area on a print sheet, wherein the area specifying data indicates that the object is arranged in the particular area in case that the object is printed on the print sheet, and wherein the area specifying data is generated based on the print data and the size data included in the external data;

generate the layout data based on the received print data and the generated area specifying data; and transmit the generated layout data to the terminal device, wherein the instructions stored in the memory of the terminal device, when executed by the processor of the terminal device, further cause the terminal device to:

generate the preview image data based on the layout data, the preview image data being generated by placing the image data in accordance with the area specifying data included in the layout data, the preview image data representing a preview image of the print data on the print sheet; and display the generated preview image on the display, wherein the print data includes vector data, wherein the layout data includes background information representing a background image of the preview image, and wherein the background image represented by the background information includes an image which is drawn based on the vector data.

2. The printing system according to claim 1, wherein print sheet size information related to a size of the print sheet is transmitted from the terminal device, the print sheet size information being received by the printer, and wherein the layout data is generated using the print sheet size information.

3. The printing system according to claim 1, wherein the area specifying data includes an origin information of the area in which the object corresponding to the location data is arranged and object size information representing a size of the object to be arranged in the area.

4. The printing system according to claim 1, wherein the print data includes the image data, and wherein the layout data is generated using the image data.

5. The printing system according to claim 1, wherein the print data includes character string data representing a character string including a plurality of characters, and wherein the layout data includes a plurality of pieces of location identification data representing locations at which the plurality of characters are allocated, respectively.

6. The printing system according to claim 1, wherein a print request for requesting the printer to print the print data is transmitted by the terminal device, wherein the printer is configured to print the print data when the print data and the print request are received, and wherein the layout data is generated when the print data and the layout data request are received by the printer.

7. The printing system according to claim 1, wherein the layout data is text data.

8. A printer configured to communicate with a terminal device, the printer comprising:

an interface configured to communication with the terminal device;

a processor electrically coupled to the interface; and memory storing computer readable instructions that, when executed by the processor, cause the printer to:

receive print data from the terminal device, the print data including location data representing a particular location where image data representing an object is stored, the particular location being different from the printer and the terminal device;

receive layout data request from the terminal device, the layout data request being a request for requesting the printer to transmit a layout data to the terminal device;

transmit, in response to receipt of the layout data request, an external data request to the particular location in accordance with the location data included in the print data;

receive external data from the particular location in response to the external data request, the external data including size data representing a size of the object, the size data being included in a header of the image data;

generate area specifying data specifying a particular area on a print sheet, wherein the area specifying data indicates that the object is arranged in the particular area in case that the object is printed on the print sheet, and wherein the area specifying data is generated based on the print data and the size data included in the external data;

generate the layout data based on the received print data and the generated area specifying data; and transmit the generated layout data to the terminal device, wherein the print data includes vector data, wherein the layout data includes background information representing a background image of the preview image, and wherein the background image represented by the background information includes an image which is drawn based on the vector data.

9. The printer according to claim 8, wherein the layout data is text data.

10. A terminal device configured to communicate with a printer, the terminal device comprising:
- an interface configured to communicate with the printer;
- a display;
- a processor electronically coupled to the interface and the display; and
- memory storing computer readable instructions that, when executed by the processor, cause the terminal device to:
- transmit print data to the printer, the print data including location data representing a particular location where image data representing an object is stored, the particular location being different from the printer and the terminal device;
- transmit a layout data request to the printer, the layout data request being a request for requesting the printer to transmit layout data to the terminal device;
- receive the layout data generated by the printer in response to the layout data request, the printer receiving external data from the particular location in response to an external data request to the particular location in accordance with the location data included in the print data, the external data including size data representing a size of the object, the size data being included in a header of the image data, and the printer generating area specifying data specifying a particular area on a print sheet, wherein the area specifying data indicates that the object is arranged in the particular area in case that the object is printed on the print sheet, and wherein the area specifying data is generated based on the print data and the size data included in the external data, and the printer generating the layout data based on the received print data and the generated area specifying data;
- generate preview image data based on the layout data, the preview image data being generated by placing the image data in accordance with the area specifying data included in the layout data, the preview image data representing a preview image showing a result of printing if the printer would print the print data on the print sheet; and
- display the generated preview image on the display,
- wherein the print data includes vector data
- wherein the layout data includes background information representing a background image of the preview image, and
- wherein the background image represented by the background information includes an image which is drawn based on the vector data.

11. A non-transitory recording medium storing computer readable instructions for a printer, wherein the computer readable instructions, when executed by a processor of the printer, cause the printer to implement:
- receiving print data from a terminal device, the print data including location data representing a particular location where image data representing an object is stored, the particular location being different from the printer and the terminal device;
- receiving layout data request from the terminal device, the layout data request being a request for requesting the printer to transmit a layout data to the terminal device;
- transmitting, in response to receipt of the layout data request, an external data request to the particular location in accordance with the location data included in the print data;
- receiving external data from the particular location in response to the external data request, the external data including size data representing a size of the object, the size data being included in a header of the image data;
- generating area specifying data specifying a particular area on a print sheet, wherein the area specifying data indicates that the object is arranged in the particular area in case that the object is printed on the print sheet, and wherein the area specifying data is generated based on the print data and the size data included in the external data;
- generating the layout data based on the received print data and the generated area specifying data; and
- transmitting the generated layout data to the terminal device,
- wherein the print data includes vector data,
- wherein the layout data includes background information representing a background image of the preview image, and
- wherein the background image represented by the background information includes an image which is drawn based on the vector data.

12. The recording medium according to claim 11, wherein the layout data is text data.

13. A non-transitory recording medium storing computer readable instructions for a terminal device, wherein the computer readable instructions, when executed by a processor of the terminal device, cause the terminal device to implement:
- transmitting print data to a printer, the print data including location data representing a particular location where image data representing an object is stored, the particular location being different from the printer and the terminal device;
- transmitting a layout data request to the printer, the layout data request being a request for requesting the printer to transmit layout data to the terminal device;
- receiving the layout data generated by the printer in response to the layout data request, the printer receiving external data from the particular location in response to an external data request to the particular location in accordance with the location data included in the print data, the external data including size data representing a size of the object, the size data being included in a header of the image data, and the printer generating area specifying data specifying a particular area on a print sheet, wherein the area specifying data indicates that the object is arranged in the particular area in case that the object is printed on the print sheet, and wherein the area specifying data is generated based on the print data and the size data included in the external data, and the printer generating the layout data based on the received print data and the generated area specifying data;
- generating preview image data based on the layout data, the preview image data being generated by placing the image data in accordance with the area specifying data included in the layout data, the preview image data representing a preview image showing a printing result if the printer would print the print data on the print sheet; and
- displaying the generated preview image on a display,
- wherein the print data includes vector data,
- wherein the layout data includes background information representing a background image of the preview image, and
- wherein the background image represented by the background information includes an image which is drawn based on the vector data.

* * * * *